(12) United States Patent
Roth et al.

(10) Patent No.: US 6,672,056 B2
(45) Date of Patent: Jan. 6, 2004

(54) DEVICE FOR COOLING COMPONENTS BY MEANS OF HYDRAULIC FLUID FROM A HYDRAULIC CIRCUIT

(75) Inventors: Jürgen Roth, Niedernberg (DE); Franz Fleckenstein, Mainaschaff (DE)

(73) Assignee: Linde Aktiengesellschaft (DE)

( * ) Notice: Subject to any disclaimer, the term of this patent is extended or adjusted under 35 U.S.C. 154(b) by 0 days.

(21) Appl. No.: 10/147,435

(22) Filed: May 16, 2002

(65) Prior Publication Data

US 2003/0024241 A1 Feb. 6, 2003

(30) Foreign Application Priority Data

May 23, 2001 (DE) .......................................... 101 25 350

(51) Int. Cl.[7] .............................................. B60K 11/02
(52) U.S. Cl. ....................................................... 60/456
(58) Field of Search ........................... 60/329, 456, 337

(56) References Cited

U.S. PATENT DOCUMENTS

| | | | | |
|---|---|---|---|---|
| 4,321,793 A | * | 3/1982 | Uranaka et al. .............. | 60/456 |
| 4,371,318 A | * | 2/1983 | Kime .......................... | 60/464 |
| 5,789,879 A | * | 8/1998 | Cook .......................... | 318/101 |
| 6,029,445 A | * | 2/2000 | Lech ........................... | 60/456 |
| 6,295,913 B1 | * | 10/2001 | Rothering ..................... | 60/394 |

FOREIGN PATENT DOCUMENTS

EP 0 889 001 A2 1/1999

* cited by examiner

*Primary Examiner*—Edward K. Look
*Assistant Examiner*—Thomas E. Lazo
(74) *Attorney, Agent, or Firm*—Webb Ziesenheim Logsdon Orkin & Hanson, P.C.

(57) ABSTRACT

The invention relates to a device for cooling at least one component by hydraulic fluid from a hydraulic circuit. The hydraulic circuit includes a hydraulic pump, at least one user of hydraulic energy, and a reservoir. The component is connected into the hydraulic circuit between a heat exchanger and the intake side of the pump. The component is connected into a suction line that connects the reservoir with the pump. Between the component and the pump there is a control valve connected on the output side to a bypass suction line connected with the reservoir. In a first position of the control valve, the suction line is closed and the bypass suction line is open. In a second position of the control valve, the suction line is at least partly open. The heat exchanger can be connected into the suction line or into the return line.

11 Claims, 1 Drawing Sheet

DEVICE FOR COOLING COMPONENTS BY MEANS OF HYDRAULIC FLUID FROM A HYDRAULIC CIRCUIT

CROSS-REFERENCE TO RELATED APPLICATION

This application claims priority to German Application No. 101 25 350.8, filed May 23, 2001, herein incorporated by reference in its entirety.

BACKGROUND OF THE INVENTION

1. Field of the Invention

This invention relates to a device for cooling at least one component by means of hydraulic fluid from a hydraulic circuit which has a hydraulic pump, at least one user of hydraulic energy connected to it, and a reservoir, wherein the component is connected in the hydraulic circuit between a heat exchanger and the intake side of the pump.

2. Technical Considerations

A known device is described in EP 0 889 001 A2. This document describes in very general terms a functional principle in which the drive system of a fork lift truck, for example, an electric motor and the associated electronic power actuator or an internal combustion engine is cooled by hydraulic fluid from a hydraulic steering system. The steering pump thereby performs the function of a cooling pump. The reservoir is located in a counterweight of the fork lift truck. The counterweight, on account of its considerable mass, acts as a heat exchanger (cooler). However, this document does not contain any further information on an operationally reliable realization of the principle which is advantageous in terms of the ease and cost of construction.

Therefore, it is an object of the invention to provide a device of the general type described above but which is operationally reliable and is easy and economical to manufacture.

SUMMARY OF THE INVENTION

The invention teaches that the above object can be achieved by connecting the component into a suction line that connects the tank with the pump. Between the component and the pump there is a control valve which is connected on the input side to a bypass suction line that is connected with the reservoir. In a first switched position of the control valve, the suction line is closed and the bypass suction line is open and in a second switched position of the control valve the suction line is at least partly open and the bypass suction line is closed or at least partly closed.

The invention therefore teaches the location of the component to be cooled in the area between the reservoir and the intake side of the pump so that the component can be cooled by hydraulic fluid sucked in, wherein the suction can be influenced by the position of the control valve.

At startup, for example, when both the component to be cooled as well as the hydraulic fluid are still cold, the hydraulic fluid can flow through the bypass suction line directly to the inlet side of the pump. Therefore, there is a suction pressure which is lower than when the intake is through the suction line, i.e., through the component to be cooled.

By actuating the control valve at some later time, the system can be switched to the suction line or the suction line can be added so that hydraulic fluid flows to the suction side of the pump exclusively or additionally through the component to be cooled.

It is additionally possible to act on the control valve to influence the quantity of hydraulic fluid that is used to cool the component so that even with a relatively small temperature gradient in the heat exchanger, a sufficient amount of heat can be removed from the component to be cooled.

The heat exchanger can be integrated into the reservoir. In one advantageous embodiment of the invention, however, it is also possible to connect the heat exchanger into the suction line. In that case, the cooling action of the heat exchanger can be assisted by a fan that can be turned on and off as necessary.

In an additional advantageous configuration of the invention, the heat exchanger is connected into a return line that empties into the reservoir, in which case the hydraulic fluid in the reservoir is always cooled. The above object of the invention can also be accomplished by the connection of the component into a return line that empties into the reservoir. In the return line, upstream of the component, a control valve is located to the output side of which a bypass return line (which is routed in parallel to the return line and empties into the reservoir) is connected. In a first switched position of the control valve the return line is closed and the bypass return line is open. In a second switched position of the control valve the return line is at least partly open and the bypass return line is closed or at least partly closed.

In both of the examples described above, it is possible for an operator to actuate the control valve in any manner at any time. It is advantageous, however, if the control valve can be externally controlled as a function of the temperature of the component. An electromagnetic actuator can be used for this purpose.

The quantity of hydraulic fluid that flows through the component to be cooled can be controlled if the control valve is a continuous action valve. In connection with the above-mentioned measurement of the temperature of the component to be cooled (direct or indirect measurement, e.g., by means of the temperature difference of the hydraulic fluid flowing through it), the control valve can be actuated as necessary to deliver exactly the amount of hydraulic fluid required for the cooling of the component to be cooled.

In this context, in one advantageous development of the invention, the delivery volume of the pump can be adjusted as a function of the temperature of the component.

A combination of the two embodiments of the invention described above is also possible, in which at least one component to be cooled is located in both the suction line and in the return line.

BRIEF DESCRIPTION OF THE DRAWINGS

Additional advantages and details of the invention are explained below in greater detail with reference to the exemplary embodiments illustrated in the accompanying schematic figures, in which.

DESCRIPTION OF THE PREFERRED EMBODIMENTS

Figure 1:
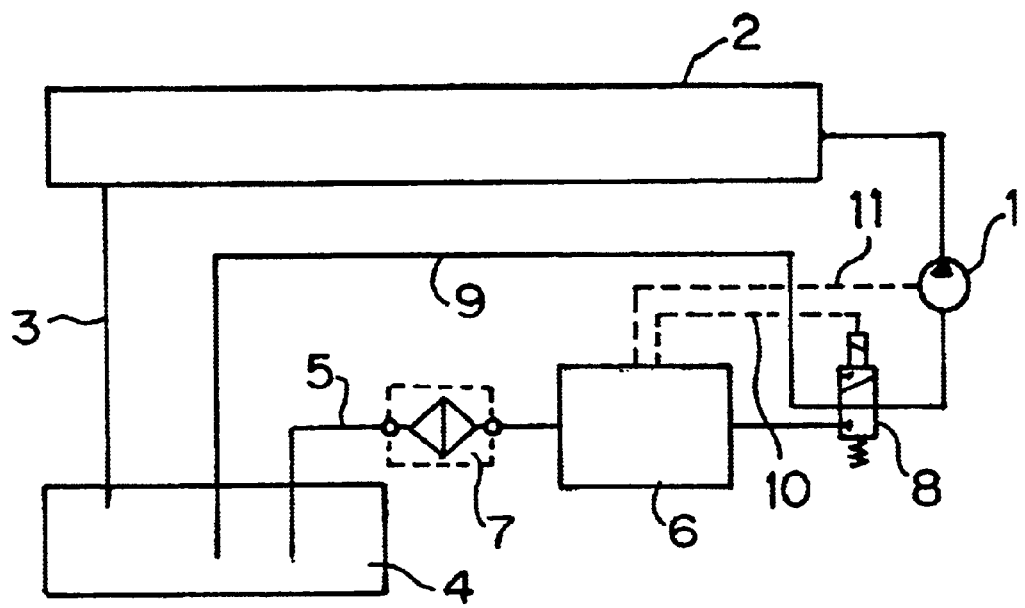
FIG. 1 is a schematic diagram of a device of the invention for cooling a component.

FIG. 1 shows a hydraulic pump 1 to which one or more users 2 are connected. A return line 3 leads from the user 2 to a reservoir 4, from which reservoir 4 the pump 1 takes in hydraulic fluid. For this purpose, a suction line 5 runs from the reservoir 4 to the pump 1. The hydraulic circuit formed from the above-mentioned components can be installed, for example, in an industrial truck (e.g., a fork lift truck), in the hydraulic traction system, and/or in the hydraulic work system.

A component 6 to be cooled is connected into the suction line 5. (It is also possible to have a plurality of components 6 to be cooled in a series or parallel connection.) These components 6 can be an electronic power control system that heats up during operation and from which heat must be removed to prevent overheating. For this purpose, a heat exchanger 7 is installed in the suction line 5 upstream of the component 6.

It is also possible, however, to locate the heat exchanger 7 in the return line 3, and in this manner to always have a "cool" reservoir. The reservoir 4 in all cases acts as a storage container for the hydraulic fluid and acts as an equalization container for the coolant.

Between the component 6 and the pump 1 there is a control valve 8 which can be a continuous action valve, i.e., a valve that acts as a throttle in intermediate positions. On the input side, both the suction line 5 and the bypass suction line 9 are connected to the control valve 8. The control valve 8 can be actuated electromagnetically as a function of the temperature of the component 6 to be cooled (broken line 10 between the component 6 and the control valve 8 represents a temperature sensing connection). It is also possible, as a function of the temperature of the component 6 to be cooled, to turn on the pump 1 or to adjust the delivery volume of the pump 1 (broken line 11 between the component 6 and the pump 1), e.g., to increase the delivery volume of the pump 1 by a higher speed of the pump 1 or by adjusting the displacement volume.

In the switched position of the control valve 8 illustrated in FIG. 1, the bypass suction line 9 is open, i.e., the bypass suction line 9 is connected to the intake side of the pump 1, while the suction line 5 is closed. In a second switched position of the control valve 8, the suction line 5 is opened partly or all the way. The bypass suction line 9 can thereby be closed or open. In any case, hydraulic fluid is sucked through the suction line 5 and, thus, through the component 6 to be cooled.

Figure 2:
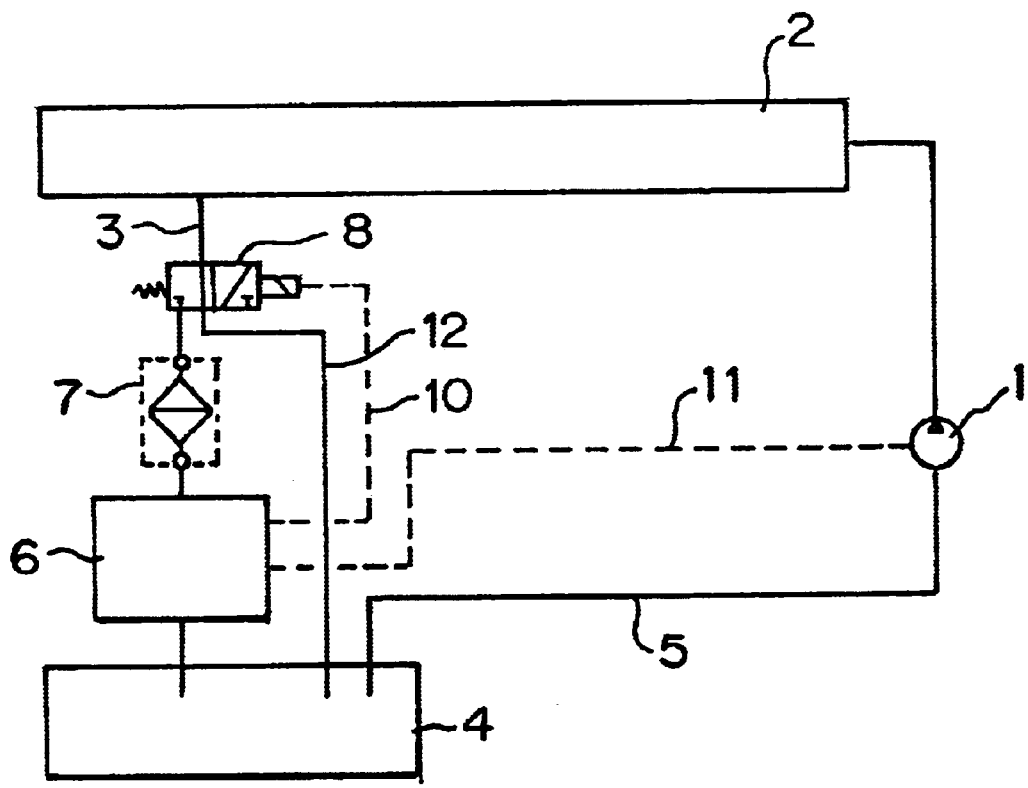
FIG. 2 is a schematic diagram of a second device of the invention for cooling a component.

The device illustrated in FIG. 2 differs from the device illustrated in FIG. 1 in that the component 6 to be cooled is located in the return line 3. The control valve 8 is located upstream of the component 6 and upstream of an upstream heat exchanger 7, and on its output side has a bypass return line 12. In this embodiment of the invention, too, the control valve 8 can be a continuous action valve and can be controlled as a function of the temperature of the component 6. The pump 1 can also be controlled as a function of the temperature of the component 6 to be cooled.

In the switched position of the control valve 8 illustrated in FIG. 2, the bypass return line 12 is open, while the return line 3 is closed. In a second switched position of the control valve 8, the return line 3 is open. The bypass return line 12 can thereby be closed or open. In the second switched position, the hydraulic fluid flowing from the user toward the reservoir 6 after passing the heat exchanger 7 cools the component 6.

It is also conceivable to combine the systems illustrated in FIGS. 1 and 2 with each other, i.e., to locate one or more components 6 to be cooled in the return line 3 and/or one or more components 6 in the suction line 5.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:

1. A device to cool at least one component by hydraulic fluid, comprising:
    a hydraulic circuit comprising a hydraulic pump, at least one user of hydraulic energy connected to the hydraulic pump, and a reservoir; and
    a heat exchanger, wherein the component is connected into the hydraulic circuit between the heat exchanger and an intake side of the pump,
    wherein the component is connected into a suction line that connects the reservoir with the pump,
    wherein between the component and the pump there is a control valve which is connected on an output side to a bypass suction line that is connected with the reservoir, and
    wherein in a first switched position of the control valve the suction line is closed and the bypass suction line is open, and in a second switched position of the control valve the suction line is at least partly open and the bypass suction line is closed or at least partly closed.

2. The device as claimed in claim 1, wherein the heat exchanger is connected into the suction line.

3. The device as claimed in claim 1, wherein the heat exchanger is connected into a return line that empties into the reservoir.

4. A device to cool at least one component by hydraulic fluid, comprising:
    a hydraulic circuit comprising a hydraulic pump, at least one user of hydraulic energy connected to the hydraulic pump, and a reservoir; and
    a heat exchanger, wherein the component is connected into the hydraulic circuit between the heat exchanger and an intake side of the pump,
    wherein the component is connected into a return line that empties into the reservoir,
    wherein upstream of the component there is a control valve,
    wherein connected to the output side of the control valve there is a bypass return line which is connected in parallel to the return line and empties into the reservoir, and
    wherein in a first switched position of the control valve the return line is closed and the bypass return line is open and in a second switched position of the control valve the return line is at least partly open and the bypass return line is closed or at least partly closed.

5. The device as claimed in claim 1, wherein the control valve is externally actuated as a function of the temperature of the component.

6. The device as claimed in claim 1, wherein the control valve is a continuous action valve.

7. The device as claimed in claim 1, wherein the delivery volume of the pump is adjustable as a function of the temperature of the component.

8. The device as claimed in claim 4, wherein the control valve is externally actuated as a function of the temperature of the component.

9. The device as claimed in claim 4, wherein the control valve is a continuous action valve.

10. The device as claimed in claim 4, wherein the delivery volume of the pump is adjustable as a function of the temperature of the component.

11. A device to cool at least one component by hydraulic fluid, comprising:

a hydraulic circuit comprising a hydraulic pump, at least one user of hydraulic energy connected to the hydraulic pump, and a reservoir;

at least one heat exchanger, wherein the component is connected into the hydraulic circuit between the heat exchanger and an intake side of the pump, wherein the component is connected to at least one of a suction line that connects the reservoir with the pump or a return line that empties into the reservoir; and at least one control valve, wherein the control valve is connected on an output side to at least one of a bypass suction line connected with the reservoir or a bypass return line connected to the return line and emptying into the reservoir, wherein in a first switched position of the control valve, at least one of the suction line and the return line is closed and at least one of the bypass suction line and the bypass return line is open, and wherein in a second switched position of the control valve, at least one of the suction line and the return line is at least partly open.

* * * * *